(12) United States Patent
Cho et al.

(10) Patent No.: US 8,892,151 B2
(45) Date of Patent: Nov. 18, 2014

(54) AUTONOMOUS USER EQUIPMENT TRANSMISSION POWER CONTROL IN COMMUNICATION SYSTEMS

(75) Inventors: Joon-Young Cho, Suwon-si (KR); Aris Papasakellariou, Houston, TX (US)

(73) Assignee: Samsung Electronics Co., Ltd (KR)

( * ) Notice: Subject to any disclaimer, the term of this patent is extended or adjusted under 35 U.S.C. 154(b) by 975 days.

(21) Appl. No.: 12/365,574

(22) Filed: Feb. 4, 2009

(65) Prior Publication Data

US 2009/0227278 A1  Sep. 10, 2009

Related U.S. Application Data

(60) Provisional application No. 61/025,925, filed on Feb. 4, 2008.

(51) Int. Cl.
| | | |
|---|---|---|
| *H04B 7/00* | (2006.01) | |
| *H04L 1/16* | (2006.01) | |
| *H04W 52/48* | (2009.01) | |
| *H04L 1/00* | (2006.01) | |
| *H04L 5/00* | (2006.01) | |
| *H04W 72/04* | (2009.01) | |
| *H04W 52/14* | (2009.01) | |

(52) U.S. Cl.
CPC ............ *H04W 52/48* (2013.01); *H04L 1/1607* (2013.01); *H04W 72/04* (2013.01); *H04W 52/146* (2013.01); *Y02B 60/50* (2013.01); *H04L 1/0026* (2013.01); *H04L 5/0053* (2013.01); *H04L 1/0028* (2013.01); *H04L 5/0007* (2013.01)
USPC ........... 455/522; 455/450; 455/509; 370/328; 370/329; 370/342

(58) Field of Classification Search
USPC .......... 455/522, 69, 13.4, 504, 509, 434, 450, 455/452.2, 67.11, 296, 318; 370/336, 278, 370/431, 235, 280, 328, 335, 342, 329, 344, 370/208, 210, 349
See application file for complete search history.

(56) References Cited

U.S. PATENT DOCUMENTS

| | | | |
|---|---|---|---|
| 2002/0115443 A1 | 8/2002 | Freiberg et al. | |
| 2004/0229641 A1 | 11/2004 | Takagi | |

(Continued)

FOREIGN PATENT DOCUMENTS

| | | |
|---|---|---|
| EP | 1 830 489 | 9/2007 |
| JP | 2004-343258 | 12/2004 |
| JP | 2006-211210 | 8/2006 |
| WO | WO 2007/091235 | 8/2007 |
| WO | WO 2007120020 A1 * | 10/2007 |
| WO | WO 2007/136002 | 11/2007 |

OTHER PUBLICATIONS

Ad Hoc Chairman: "Notes from Uplink Control Signaling Discussions", TSG-RAN WG1#50, R1-073842, Aug. 20-24, 2007.

(Continued)

*Primary Examiner* — Thienvu Tran
*Assistant Examiner* — Christopher Lo
(74) *Attorney, Agent, or Firm* — The Farrell Law Firm, P.C.

(57) ABSTRACT

Apparatus and method for adjusting at a user equipment a power level of a first signal type transmitted over a set of resource elements (REs). The method includes transmitting the first signal type with a first power level over a first set of REs, and transmitting the first signal type with a second power level over a second set of REs, wherein the second power level is higher than the first power level and the second set of REs is a sub-set of the first set of REs.

18 Claims, 6 Drawing Sheets

(56) References Cited

U.S. PATENT DOCUMENTS

| | | |
|---|---|---|
| 2005/0107036 A1* | 5/2005 | Song et al. ............... 455/23 |
| 2005/0238053 A1 | 10/2005 | Iochi et al. |
| 2006/0092887 A1 | 5/2006 | Iacono et al. |
| 2006/0211441 A1* | 9/2006 | Mese et al. .............. 455/522 |
| 2006/0221885 A1 | 10/2006 | Nagaraj |
| 2007/0173276 A1* | 7/2007 | Love et al. .............. 455/522 |
| 2007/0183520 A1 | 8/2007 | Kim et al. |
| 2007/0270155 A1* | 11/2007 | Nelson et al. ........... 455/452.2 |
| 2013/0336254 A1 | 12/2013 | Imamura et al. |

OTHER PUBLICATIONS

Qualcomm Europe: "Details of Control and Data Multiplexing in PUSCH", 3GPP TSG-RAN WG1 #51bis, R1-080483, Jan. 14-18, 2008.

Alcatel-Lucent: "Clarification on Uplink Power Control to Support UL ICIC", 3GPP TSG RAN WG1 #51 Meeting, R1-074987, Oct. 30, 2007.

Motorola, "Multiplexing of Uplink Control Signaling with Data", R1-070777, Feb. 12-16, 2007.

* cited by examiner

AUTONOMOUS USER EQUIPMENT TRANSMISSION POWER CONTROL IN COMMUNICATION SYSTEMS

PRIORITY

This application claims priority under 35 U.S.C. §119 to a United States Provisional Application filed in the United States Patent and Trademark Office on Feb. 4, 2008 and assigned Ser. No. 61/025,925, the entire disclosure of which is incorporated herein by reference.

BACKGROUND OF THE INVENTION

1. Field of the Invention

The present invention is directed, in general, to wireless communication systems and, more specifically, to the adaptation of transmission power adjustments in Single-Carrier Frequency Division Multiple Access (SC-FDMA) communication systems.

2. Description of the Related Art

The invention considers transmission power adjustments in SC-FDMA communication systems and is further considered in the development of the $3^{rd}$ Generation Partnership Project (3GPP) Evolved Universal Terrestrial Radio Access (E-UTRA) Long Term Evolution (LTE). The invention assumes the UpLink (UL) communication corresponding to the signal transmission from mobile User Equipments (UEs) to a serving base station (Node B). A UE, also commonly referred to as a terminal or a mobile station, may be fixed or mobile and may be a wireless device, a cellular phone, a personal computer device, a wireless modem card, etc. A Node B is generally a fixed station and may also be called a base transceiver system (BTS), an access point, or some other terminology.

The UL physical channel carrying the transmission of data information signals from UEs is referred to as the Physical Uplink Shared CHannel (PUSCH). In addition to data information signals, the PUSCH carries the transmission of Reference Signals (RS), also known as pilot signals. The PUSCH may also carry the transmission of Uplink Control Information (UCI) signals. The UCI signals may include any combination of positive or negative acknowledgement signals (ACK or NAK, respectively), Channel Quality Indicator (CQI) signals, Precoding Matrix Indicator (PMI) signals, and Rank Indicator (RI) signals. In the absence of data information signals, UCI signal transmission is through the Physical Uplink Control CHannel (PUCCH).

The ACK or NAK signal is associated with the use of Hybrid Automatic Repeat reQuest (HARQ) and is in response to the respective correct or incorrect data packet reception in the DownLink (DL) of the communication system corresponding to signal transmission from the serving Node B to a UE. The CQI signal from a UE is intended to inform the serving Node B of the channel conditions the UE experiences for signal reception in the DL, enabling the Node B to perform channel-dependent scheduling of DL data packets. The PMI/RI signals from a UE are intended to inform the serving Node B how to combine the transmission of a signal to the UE from multiple Node B antennas in accordance with the Multiple-Input Multiple-Output (MIMO) principle. Any one of the possible combinations of ACK/NAK, CQI, PMI, and RI signals may be transmitted by a UE in the same Transmission Time Interval (TTI) with data signal transmission or in a separate TTI without data transmission.

UEs are assumed to transmit UCI and/or data signals in the PUSCH over a TTI corresponding to a sub-frame.

FIG. 1 illustrates the sub-frame structure assumed in the exemplary embodiment of the invention. The sub-frame 110 includes two slots. Each slot 120 further includes $N_{symb}^{UL}=7$ transmission symbols, for example, and each transmission symbol 130 further includes a cyclic prefix (CP) for mitigating interference due to channel propagation effects. The PUSCH transmission in the two slots may be in the same part or it may be at two different parts of the operating BandWidth (BW). RS are transmitted in the middle transmission symbol of each slot 140 and in the same BW as the data signal. The RS are primarily used to provide channel estimation enabling coherent demodulation of the UCI or data signal (DM RS). The PUSCH transmission BW includes frequency resource units, which may be referred to as Resource Blocks (RBs). In an exemplary embodiment, each RB includes $N_{sc}^{RB}=12$ Resource Elements (REs), or sub-carriers, and a UE is allocated $M_{PUSCH}$ consecutive RBs 150 for its PUSCH transmission.

In order for a Node B to determine the RBs where to schedule PUSCH transmissions and the associated Modulation and Coding Scheme (MCS), a CQI estimate, such as a Signal-to-Interference and Noise Ratio (SINR) estimate, is needed over the UL scheduling BW. Typically, this UL CQI estimate is obtained through the separate transmission of an RS sounding the UL scheduling BW (Sounding RS, or SRS). The SRS is transmitted from a UE in a transmission symbol 160 of some UL sub-frames, over $M_{SRS}$ consecutive RBs 170, replacing the transmission of data or control information from the same or from a different UE. The SRS may be transmitted from UEs not having PUSCH transmission in the reference sub-frame and its transmission power is independent of the PUSCH transmission power.

An exemplary block diagram of the transmitter functions for SC-FDMA signaling is illustrated in FIG. 2. Coded CQI bits and/or PMI bits 205 and coded data bits 210 are multiplexed 220 through rate matching. If ACK/NAK bits are also multiplexed, coded data bits are punctured to accommodate ACK/NAK bits 230. The Discrete Fourier Transform (DFT) of the combined data bits and UCI bits is then obtained 240, the sub-carriers 250 for the assigned transmission BW are selected 255, the Inverse Fast Fourier Transform (IFFT) is performed 260, the CP 270 is inserted, and the selection 280 of the power amplification level 285 is applied to the transmitted signal 290. For brevity, additional transmitter circuitry, such as digital-to-analog converter, analog filters, and transmitter antennas are not shown. Also, the encoding process for data bits and CQI and/or PMI bits, as well as the modulation process, are omitted for brevity.

At the receiver, the reverse (complementary) transmitter operations are performed. This is conceptually illustrated in FIG. 3 where the reverse operations of those illustrated in FIG. 2 are performed. After an antenna receives the radio-frequency (RF) analog signal and after further processing units (such as filters, amplifiers, frequency down-converters, and analog-to-digital converters), which are not shown for brevity, the digital received signal 310 has its CP removed 320. Subsequently, the receiver unit applies an FFT 330, selects 345 the sub-carriers 340 used by the transmitter, applies an Inverse DFT (IDFT) 350, extracts the ACK/NAK bits and places respective erasures for the data bits 360, and de-multiplexes 370 the data bits 380 and CQI/PMI bits 390. As for the transmitter, well known receiver functionalities such as channel estimation, demodulation, and decoding are not shown for brevity.

Initial transmission of a Transport Block (TB) from a UE may be configured by the Node B through the transmission of a Scheduling Assignment (SA) or through higher layer signaling to the reference UE. In the former case, the PUSCH transmission parameters, including the transmission power and the Modulation and Coding Scheme (MCS) may be adapted by the SA and the respective PUSCH transmission is referred to as adaptive.

PUSCH HARQ retransmissions of a TB are assumed to be synchronous. If the initial transmission occurs in UL sub-frame n, a retransmission will occur at UL sub-frame n+M, where M is a known integer such as, for example, M=8. It is assumed that the Node B transmits to the reference UE a NAK signal in a DL sub-frame n+L prior to the n+M UL sub-frame, where L is a known integer with L<M (for example, L=4).

PUSCH HARQ retransmissions may be adaptive (configured by a SA) or non-adaptive (occurring without SA). Non-adaptive HARQ retransmissions use the same parameters as the initial transmission for the same TB. In particular, the transmission power adjustment and the PUSCH RBs are the same as the ones used for the initial transmission of the same TB.

When UCI or SRS is multiplexed in the PUSCH, it is possible that either the initial transmission includes UCI or SRS while the HARQ retransmission does not, or the reverse. In either case, for non-adaptive HARQ retransmissions, the amount of REs available for data information is different between the initial transmission and the HARQ retransmission for the same TB since the number of RBs remains the same. The UE autonomously performs rate matching or puncturing of coded data symbols to accommodate UCI or SRS transmission. However, the PUSCH transmission power remains the same. This results in a different BLock Error Rate (BLER) for the data between the initial transmission and a HARQ retransmission for the same TB due to the different effective data coding rate. The same may also occur for PUSCH transmissions configured by higher layer signaling (non-adaptive).

For example, a transmission power adjustment $\Delta_{TF}$ in sub-frame i may be computed as $\Delta_{TF}(i)=10\log_{10}(2^{K(TBS/N_{RE})}-1)$ where K is a constant, TBS is the TB Size, and $N_{RE}=2 \cdot M_{PUSCH} \cdot N_{sc}^{RB} \cdot (N_{symb}^{UL}-1)$ is the number of REs per sub-frame excluding REs used for DM RS transmission (one transmission symbol per slot is used for DM RS transmission in the exemplary structure in FIG. 1). Therefore, the PUSCH transmission power remains the same in non-adaptive HARQ retransmissions regardless of the presence or absence of UCI or SRS.

The data BLER difference between the initial transmission and a non-adaptive HARQ retransmission for the same TB is not deterministic and depends on the difference in the REs available for the data information (difference in data coding rate). If more REs are allocated to data information in the initial transmission (for example, there is no UCI or SRS transmission) than in a HARQ retransmission (for example, there is UCI or SRS transmission), the puncturing or rate matching of data information needed in the HARQ retransmission results in increased data BLER. The reverse applies if fewer REs are allocated to data information in the initial transmission and the data BLER in the non-adaptive HARQ retransmission may be lower than needed for achieving the desired system throughput.

When the previously described variability exists in the number of REs available for data information in the initial transmission and in a non-adaptive HARQ retransmission for the same TB, or for transmissions configured by higher layer signaling, the conventional approach considers that the PUSCH power adjustment in a HARQ retransmission remains the same as in the initial transmission. For example, as it was previously described, $\Delta_{TF}(i)$ does not account for UCI or SRS transmission. Then, two distinct cases exist:

(A) UCI or SRS is not included in the initial transmission but is included in a non-adaptive HARQ retransmission. Then, to decode the data, the Node B receiver may insert erasures in REs where UCI or SRS replaces data or account for the different rate matching performed at the UE. The data BLER increases, due to the increase in the effective coding rate that is not compensated by a respective increase in transmission power, and the system throughput decreases.

(B) UCI or SRS is included in the initial transmission but is not included in a non-adaptive HARQ retransmission. Then, during the HARQ retransmission, the UE may transmit additional bits in the REs where UCI or SRS were located in the initial transmission, thereby decreasing the effective code rate with rate matching. The data BLER unnecessarily decreases, due to the decrease in the effective code rate that is not compensated by a respective decrease in transmission power, and the interference management is sub-optimal due to the unnecessarily high transmission power.

Therefore, there is a need to adjust the transmission power depending on the amount of control signals or reference signals in a PUSCH transmission.

There is another need to determine the appropriate adaptation of the transmission power adjustment depending on the amount of control signals or reference signals in a PUSCH transmission.

SUMMARY OF THE INVENTION

Accordingly, the invention has been designed to solve the above-mentioned problems occurring in the prior art, and embodiments of the invention provide apparatus and method for enabling a user equipment to autonomously adapt the power of a non-adaptive signal transmission in response to variations in the presence of control signal transmission or reference signal transmission in the same transmission time interval.

In one aspect of the invention, a method for adjusting at a user equipment a power level of a first signal type transmitted over a set of resource elements (REs) includes transmitting the first signal type with a first power level over a first set of REs, and transmitting the first signal type with a second power level over a second set of REs, wherein the second power level is higher than the first power level and the second set of REs is a sub-set of the first set of REs.

In another aspect of the invention, an apparatus for adjusting at a user equipment a power level of a first signal type transmitted over a set of resource elements (REs) includes an amplification unit to provide power for transmitting the first signal type, and a power control unit to apply a first power level to the amplification unit to transmit the first signal type over a first set of REs and a second power level to the amplification unit to transmit the first signal type over a second set of REs, wherein the second power level is higher than the first power level and the second set of REs is a sub-set of the first set of REs.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS

The invention now will be described more fully hereinafter with reference to the accompanying drawings. This invention may, however, be embodied in many different forms and should not be construed as limited to the embodiments set forth herein.

Additionally, although the invention assumes a SC-FDMA communication system, it may also be applied to other communication system, such as to all FDM systems in general and to OFDMA. OFDM, FDMA, DFT-spread OFDM, DFT-spread OFDMA, single-carrier OFDMA (SC OFDMA), and single-carrier OFDM in particular.

The methods and apparatus in accordance with the exemplary embodiments of the present invention solve problems related to the need for adapting the data transmission power adjustment in PUSCH transmissions in order to maintain the desired data reception reliability when the resources used for data transmission differ due to the existence of control signals or reference signals.

The exemplary embodiment of the invention considers that the UE autonomously adapts the PUSCH transmission power adjustment $\Delta_{TF}$ in a non-adaptive HARQ retransmission in order to address the variation in the data information MCS, relative to the one used in the initial transmission of the same TB. This MCS variation is due to the variation in the amount of UCI or SRS that is included in the initial transmission or the HARQ retransmission. Then, the following applies:

(A) UCI or SRS are not included in the initial transmission but it is included in a HARQ retransmission. The UE autonomously increases the transmission power adjustment $\Delta_{TF}$ to compensate an increase in data MCS resulting from the reduction in the coding gain associated with the introduction of UCI or SRS (unless it is a power limited UE). The new, higher, data MCS is determined by the amount of inserted UCI or SRS.

(i) To address possible power limitations from a UE, the serving Node B can configure a UE whether or not to increase the power during a HARQ retransmission. Moreover, a maximum level for the power increase may also be configured. For example, this maximum level may be the same as the one used by a transmission power control mechanism that may apply to any PUSCH transmission.

(B) UCI or SRS is included in the initial transmission but it is not included in a HARQ retransmission. The UE autonomously decreases the transmission power adjustment $\Delta_{TF}$ to compensate for the decrease in data MCS resulting from the increase in the coding gain associated with the removal of UCI or SRS. The new MCS is determined by the amount of removed UCI or SRS REs.

(i) The maximum level of power reduction may be the same as the one used by a transmission power control mechanism that may apply to the PUSCH transmission.

Figure 4:
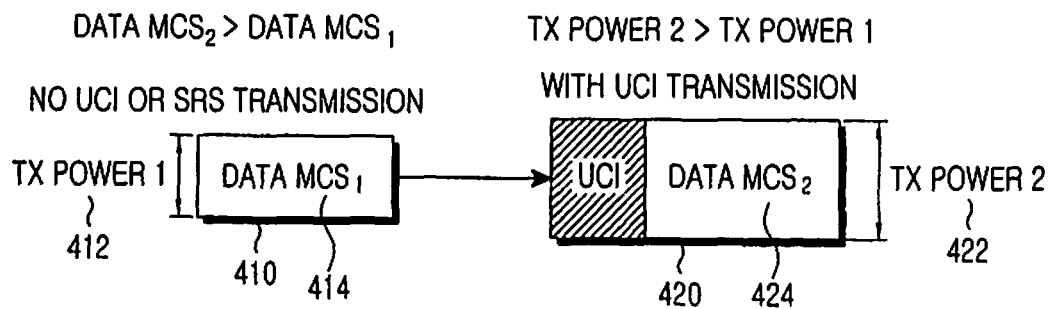
FIG. 4 is a block diagram illustrating an increase in transmission power in accordance with an exemplary embodiment of the present invention.

FIG. 4 illustrates an exemplary embodiment of the invention for adapting the transmission power adjustment to compensate for the MCS increase when UCI is included in a HARQ retransmission. For simplicity, only the UCI is shown. However, the same concept may be applied for the SRS. In the initial transmission 410 that does not include UCI or SRS transmission, the UE uses "Transmission (Tx) Power 1" 412 for the PUSCH transmission power adjustment and uses Data $MCS_1$ 414. In a HARQ retransmission 420 for the same TB that includes UCI or SRS transmission, the UE uses "Tx Power 2" 422 for the PUSCH transmission power adjustment and uses Data $MCS_2$ 424 where "Tx Power 2" is higher than "Tx Power 1" and $MCS_2$ is higher (in spectral efficiency) than $MCS_1$.

Figure 5:
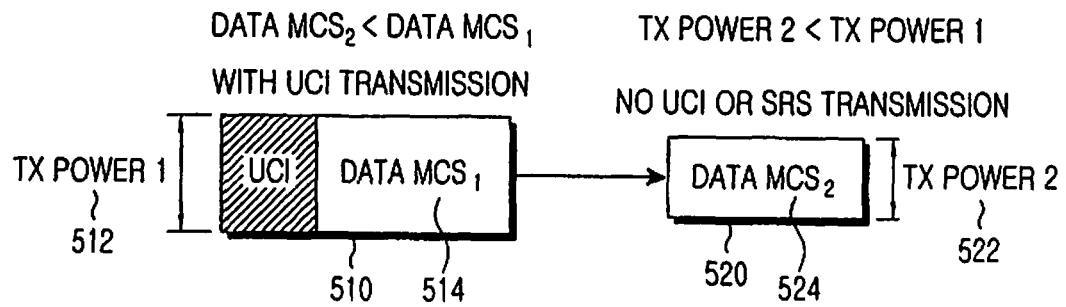
FIG. 5 is a block diagram illustrating a decrease in transmission power in accordance with an exemplary embodiment of the present invention.

FIG. 5 illustrates an exemplary embodiment of the invention for adapting the transmission power adjustment to compensate for the MCS decrease when UCI is removed in a HARQ retransmission. For simplicity, only the UCI is shown. However, the same concept may be applied for the SRS. In the initial PUSCH transmission 510 that includes UCI or SRS transmission, the UE uses "Tx Power 1" 512 and Data $MCS_1$ 514. In a HARQ retransmission 520 for the same TB that does not includes UCI or SRS transmission, the UE uses "Tx Power 2" 522 for the PUSCH transmission power adjustment and uses Data $MCS_2$ 524 where "Tx Power 2" is lower than "Tx Power 1" and $MCS_2$ is lower (in spectral efficiency) than $MCS_1$.

The adaptation of the transmission power adjustment for the setup in FIG. 4 is as follows. For a data payload of X coded bits without any UCI or SRS transmission, the data information is transmitted using all sub-frame REs (except REs used for DM RS transmission) with MCS, and "Tx Power 1" for the transmission power adjustment. When REs equivalent to Y coded data bits (Y<X) become unavailable for data transmission due to the inclusion of UCI or SRS transmission, the spectral efficiency of the data transmission increases and the transmission power adjustment needs to increase. Therefore, data $MCS_2$ when UCI or SRS is included in the PUSCH is higher than data $MCS_1$, and "Tx Power 2" is higher than "Tx Power 1".

Figure 1:
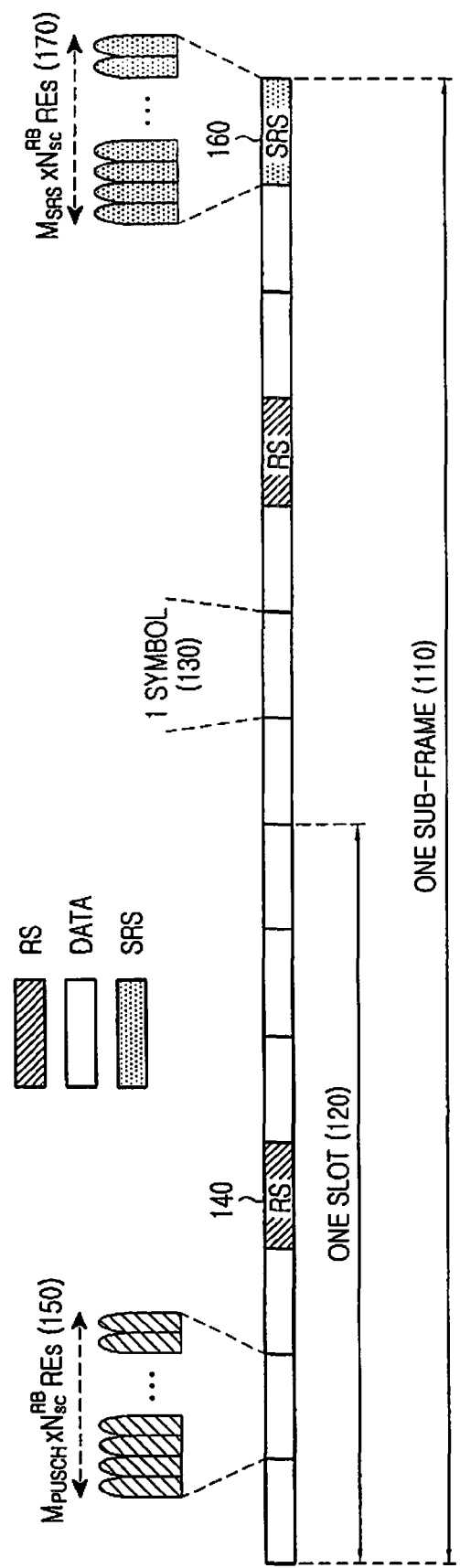
FIG. 1 is a block diagram illustrating an exemplary sub-frame structure for the SC-FDMA communication system.
Figure 2:
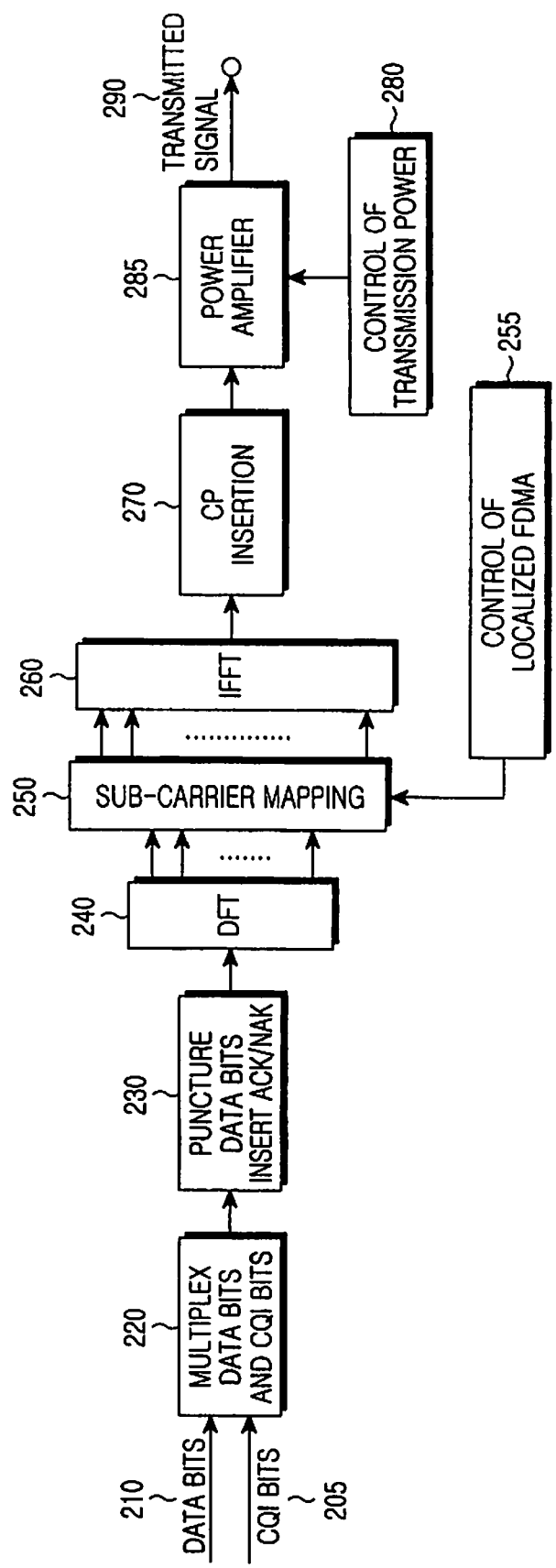
FIG. 2 is a block diagram illustrating an exemplary SC-FDMA transmitter for multiplexing data bits, CQI bits, and ACK/NAK bits in a sub-frame.
Figure 3:
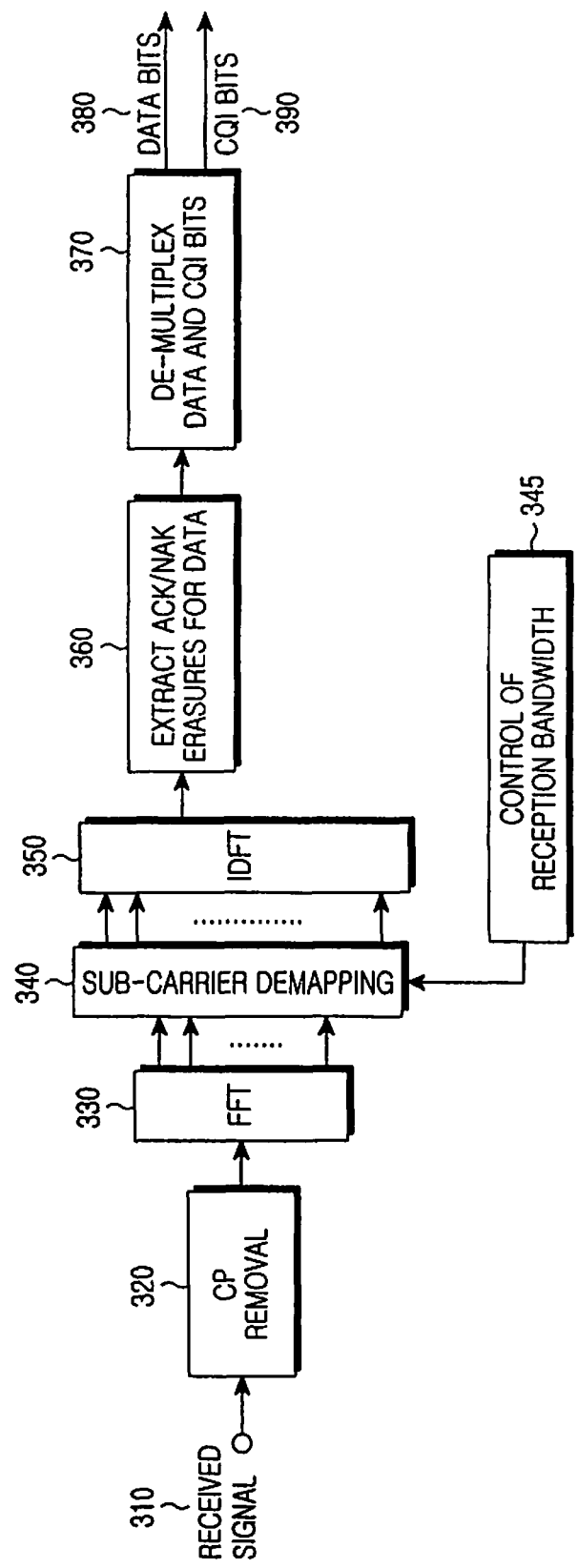
FIG. 3 is a block diagram illustrating an exemplary SC-FDMA receiver, for de-multiplexing data bits, CQI bits, and ACK/NAK bits in a sub-frame.

In case UCI is not included in a HARQ retransmission, the number of Y coded bits is assumed to be fixed and equal to the one required to incorporate SRS transmission (corresponding to REs in one transmission symbol of the sub-frame in FIG. 1). Then, $MCS_2$ is determined as having spectral efficiency $SE_2 = X/(X-Y)\ SE_1$, where $SE_1$ is the spectral efficiency of $MCS_1$, $N_{RE} = X$ for the initial transmission, and $N_{RE} = X-Y$ for the HARQ retransmission.

Figure 6:
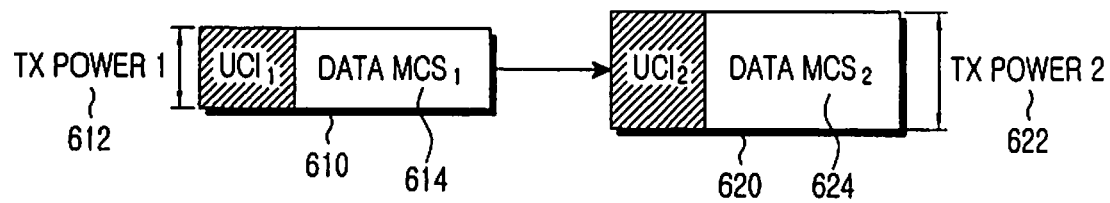
FIG. 6 is a block diagram illustrating an increase in transmission power in accordance with another exemplary embodiment of the present invention.
Figure 7:
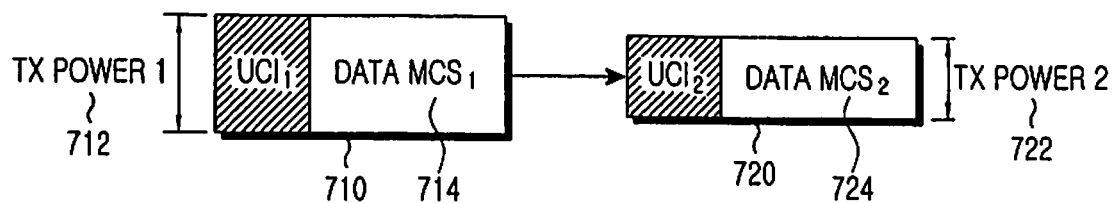
FIG. 7 is a block diagram illustrating a decrease in transmission power in accordance with another exemplary embodiment of the present invention.

FIG. 6 and FIG. 7 illustrate exemplary embodiments that correspond to the extension of FIG. 4 and FIG. 5, respectively, when UCI or SRS is included in both the initial transmission and in a HARQ retransmission. In FIG. 6, the REs required for UCI and SRS in the initial transmission 610 are less than the ones required in a HARQ retransmission 620 for the same TB. The UE uses "Tx Power 1" 612 for the PUSCH transmission power adjustment and Data $MCS_1$, 614 in the initial transmission and uses "Tx Power 2" 622 for the PUSCH transmission power adjustment and Data $MCS_2$ 624 in the HARQ retransmission where "Tx Power 1" is higher than "Tx Power 2" and $MCS_2$ is higher than $MCS_1$.

In FIG. 7, the REs required for UCI and SRS in the initial transmission 710 are more than the ones required in a HARQ retransmission 720 for the same TB. The UE uses "Tx Power 1" 712 for the PUSCH transmission power adjustment and Data $MCS_1$ 714 in the initial transmission and uses "Tx Power 2" 722 for the PUSCH transmission power adjustment and Data $MCS_2$ 724 in the HARQ retransmission where "Tx Power 2" is lower than "Tx Power 1" and $MCS_2$ is lower than $MCS_1$.

If extreme data puncturing is required to accommodate UCI, data transmission may be entirely postponed. This may occur for power limited UEs having one of the lowest MCS when a PUSCH transmission is not adaptively scheduled and UCI or SRS needs to be included. In such cases, the PUCCH may be used for the UCI transmission, and the Node B scheduler may better utilize the PUSCH resources by allocating them to other UEs.

Figure 8:
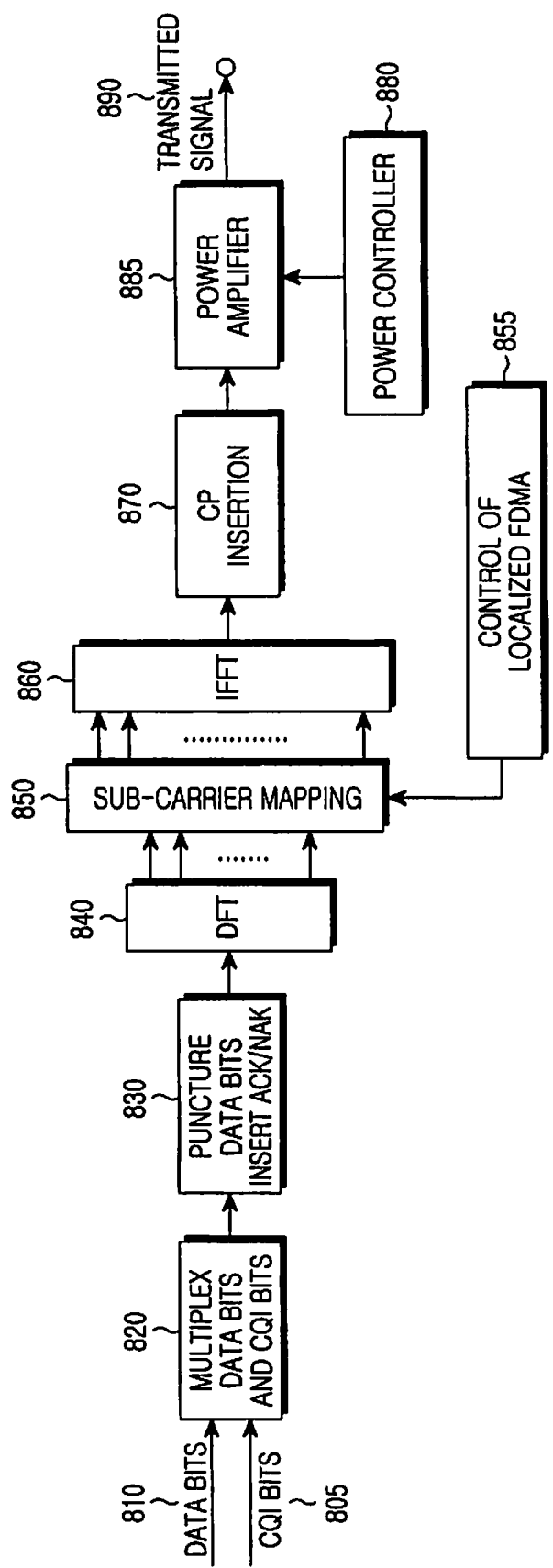
FIG. 8 is a block diagram illustrating an exemplary SC-FDMA transmitter with an exemplary embodiment of the present invention.

FIG. 8 illustrates an exemplary embodiment of the present invention. Coded CQI bits and/or PMI bits 805 and coded data bits 810 are multiplexed through rate matching in an encoding/modulating unit 820. If ACK/NAK bits are also multiplexed, coded data bits are punctured to accommodate ACK/NAK bits in puncturing unit 830. The DFT of the combined data bits and UCI bits is then obtained in DFT unit 840, the sub-carriers 850 for the assigned transmission BW are selected by control unit 855, IFFT is performed in IFFT unit 860, and the CP is inserted by CP unit 870. Once the signal is ready to be transmitted, power control unit 880 selections the power amplification level as described above and controls power amplifier 885 to apply the selected power level to the transmitted signal 890. For brevity, additional transmitter circuitry, such as digital-to-analog converter, analog filters, and transmitter antennas are not shown. Also, the encoding process for the data bits and the CQI and/or PMI bits, as well as the modulation process, are omitted for brevity.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for adjusting at a user equipment (UE) a power level of a first type signal transmitted over a set of resource elements (REs), the method comprising:
    transmitting, by a power control unit of the UE, the first type signal with a first power level when the first type signal is transmitted over a first set of REs; and
    transmitting, by the power control unit of the UE, the first type signal with a second power level when the first type signal is transmitted over a second set of REs,
    wherein the second power level is higher than the first power level and the second set of REs is a sub-set of the first set of REs, the first and second sets of REs each including a plurality of time-frequency resource units in a transmission symbol.

2. The method of claim 1, wherein the first type signal is a data signal.

3. The method of claim 1, further comprising transmitting a second type signal in REs belonging in the first set of REs and not belonging in the second set of REs.

4. The method of claim 3, wherein the second type signal is a control signal.

5. The method of claim 4, wherein the control signal comprises at least one of an acknowledgement signal, a channel quality indicator signal, a precoding matrix indicator signal, and a rank indicator signal.

6. The method of claim 3, wherein the second type signal comprises a sounding reference signal.

7. The method of claim 1, wherein the first power level is determined based on a size of the first set of REs and the second power level is based on a size of the second set of REs.

8. An apparatus for adjusting at a user equipment (UE) a power level of a first type signal transmitted over a set of resource elements (REs), the apparatus comprising:
    an amplification unit of the UE to provide power for transmitting the first type signal; and
    a power control unit of the UE to apply a first power level to the amplification unit when the first type signal is transmitted over a first set of REs, and a second power level to the amplification unit when the first type signal is transmitted over a second set of REs,
    wherein the second power level is higher than the first power level and the second set of REs is a sub-set of the first set of REs, the first and second sets of REs each including a plurality of time-frequency resource units in a transmission symbol.

9. The apparatus of claim 8, wherein the first type signal is a data signal.

10. The apparatus of claim 8, wherein a second type signal is transmitted in REs belonging in the first set of REs and not belonging in the second set of REs.

11. The apparatus of claim 10, wherein the second type signal is a control signal.

12. The apparatus of claim 11, wherein the control signal comprises of at least one of an acknowledgement signal, a channel quality indicator signal, a precoding matrix indicator signal, and a rank indicator signal.

13. The apparatus of claim 10, wherein the second type signal comprises a sounding reference signal.

14. The apparatus of claim 8, wherein the first power level is determined based on a size of the first set of REs and the second power level is based on the size of the second set of REs.

15. The method of claim 1, further comprising adjusting a Modulation and Coding Scheme (MCS) for the first type signal based on a size of the first set of REs, the MCS being used in the transmitting the first type signal.

16. The apparatus of claim 8, wherein the power control unit of the UE is adapted to adjust a Modulation and Coding Scheme (MCS) for the first type signal based on a size of the first set of REs, the MCS being used for a transmission of the first type signal.

17. The method of claim 1, wherein the first type signal comprises one of an initial transmission of data and a non-adaptive Hybrid Automatic Repeat reQuest HARQ retransmission of the data when the first type signal is transmitted over the first set of REs, and
    the first type signal comprises another one of the initial transmission of data and the non-adaptive HARQ retransmission of the data when the first type signal is transmitted over the second set of REs.

18. The apparatus of claim 8, wherein the first type signal comprises one of an initial transmission of data and a non-adaptive Hybrid Automatic Repeat reQuest HARQ retransmission of the data when the first type signal is transmitted over the first set of REs, and
    the first type signal comprises another one of the initial transmission of data and the non-adaptive HARQ retransmission of the data when the first type signal is transmitted over the second set of REs.

* * * * *